Figure 1:
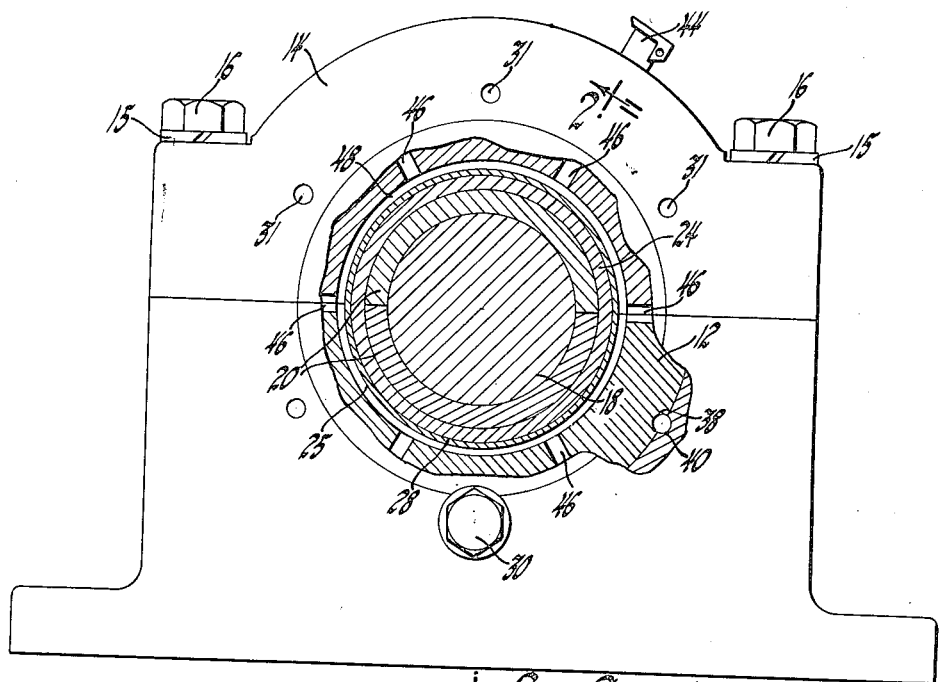

Oct. 9, 1956

A. E. ROACH 2,766,078

BEARING ASSEMBLY

Filed July 8, 1953

INVENTOR
Arvid E. Roach
BY
ATTORNEY

United States Patent Office 2,766,078
Patented Oct. 9, 1956

2,766,078

BEARING ASSEMBLY

Arvid E. Roach, Detroit, Mich., assignor to General Motors Corporation, Detroit, Mich., a corporation of Delaware Application July 8, 1953, Serial No. 366,655

8 Claims. (Cl. 308—63)

This invention relates to improvements in bearing operation and more particularly to an improved bearing assembly.

The most important characteristics of bearing materials generally are score resistance, compressive strength and fatigue strength, embeddability and conformability, and corrosion resistance. The selection of a bearing material necessarily involves a compromise because many bearing characteristics desirable in a particular application are incompatible. The relative importance of these characteristics depends, of course, upon the particular application intended. Hence, fatigue strength is of a minor importance for unidirectionally loaded bearings such as electric motor bearings. On the other hand, fatigue strength is of major importance for dynamically loaded bearings such as the main and connecting rod bearings of internal combustion engines. Similarly, embeddability, which is of slight concern in bearings which are not subjected to abrasive wear, is exceedingly important in bearings to be used in internal combustion engines.

An examination of used bearings from an internal combustion engine will reveal many small particles of foreign material embedded in the bearing surfaces. These particles, generally ranging in size from about 1 to 100 microns, come from several sources. They may be particles of core sand which have shaken loose from the engine castings. They may be metallic particles which have worn away from the cylindrical walls or gear teeth. In the case of motor vehicle engines there are particles of road dust such as abrasive silica particles which have been drawn into the engine. Whatever their origin, the abrasive particles eventually find their way in the crankcase oil where they are carried in the oil as it is pumped through the oil galleries until they finally reach the bearing surfaces.

Prior bearings adapted for use in internal combustion engines and other applications where dynamic loading and abrasive wear are serious problems have employed a hard journal surface of steel or the like operatively supported by a softer bearing surface of babbitt or similar material. A heavily loaded journal rotating in a cylindrical bearing is actually supported by a relatively small portion of the lower bearing surface. It follows then that the oil film between the journal surface and the bearing is thinnest in the vicinity of the line of load application.

An abrasive particle in the oil lubricating such a bearing is carried into the converging clearance space between the bearing and journal toward the thinnest portion of the oil film where the bearing load is at a maximum. Employing a hardened journal with a soft bearing material causes such an abrasive particle, if larger than the minimum oil film thickness, to be forced or embedded into the relatively soft bearing surface. Hence, in operation, the bearing becomes a lap charged with abrasive particles. As the journal rubs against this abrasive-charged surface, heat is generated and the journal is worn away. Moreover, such wear is not self-limiting. The journal surface is worn away throughout its entire circumference thereby increasing the clearance between the journal and the bearing. This, of course, reduces the thickness of the load-supporting oil film by concentrating the load on a more limited oil film area, thus causing the journal to bear down on the embedded abrasive particles harder than ever.

I have now discovered that the aforementioned difficulties can be avoided and a greatly improved bearing operation provided by employing a hardened bearing surface togther with a softer journal wear surface and by providing means for indexing the hard bearing periodically to distribute its wear evenly. Employing such a bearing assembly avoids the aforementioned difficulties since any abrasive particles carried in the lubricating oil become embedded in the soft journal surface instead of the bearing. Since there is no continuous contact between the embedded abrasive particles and the bearing during most of the journal revolution, abrasive wear can occur only over a limited area once each revolution. Not only is bearing wear thereby localized, but such wear is self-limiting because this wear does not have the effect of decreasing the effective diameter of the journal relative to the bearing. Hence, the wear decreases the clearance between the bearing and journal and causes the journal to assume an equilibrium position farther from the bearing.

Since a bearing assembly embodying the present invention provides a localized bearing wear area, a worn bearing need not be replaced but merely repositioned by rotating or indexing it about its axis through a small angle with respect to its housing.

Accordingly, it is a principal object of this invention to provide an improved bearing assembly which is extremely resistant to abrasive wear. A further object is the provision of an improved journal-bearing combination and means for greatly improving the wear characteristics of such a combination. A further object is the provision of an improved bearing assembly having a circumferentially indexable hard bearing surface and a corresponding journal surface formed from a soft bearing material. These and other objects and advantages of the invention will more fully appear from the following description taken in connection with the accompanying drawing.

Figure 2:
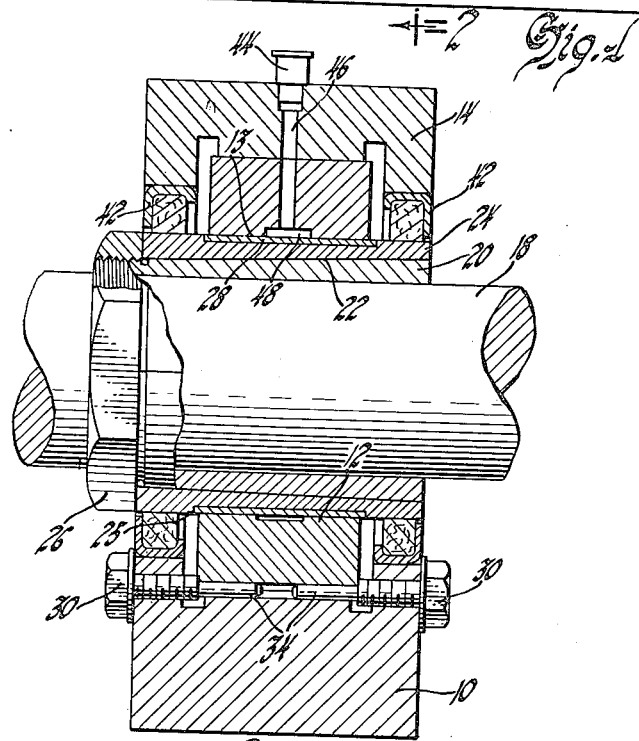

Referring now to the drawing;

Fig. 1 is an end view partially in section and with parts broken away of a bearing assembly embodying the invention; and Fig. 2 is a view taken along the lines 2—2 of Fig. 1.

Referring more particularly to the drawing, there is illustrated one type of bearing assembly embodying the invention. The non-rotating portion of the assembly comprises a bearing support, indicated generally at 10 and provided with oil seals 42, a bearing cap 14 secured to the bearing support 10 through lock washers 15 by bolts 16, and a bearing 12 having a hard wear surface 13. It will be understood that this bearing 12 may consist of a unitary annular ring structure, or as illustrated in the drawing, a two-piece split ring structure. The bearing 12 is indexable with respect to the bearing support 10 and may be circumferentially or radially indexed to any desired position relative to the bearing support. In the embodiment shown in the drawing, the bearing 12 may be rotated about its longitudinal axis to any one of six different positions. The bearing is locked against movement by one or more machine screws 30 having keyed portions 34 which, as shown in Fig. 2, extend through one or more threaded openings 31 in the end walls of the housing into openings formed by turning the bearing 12 to align corresponding cutout portions 38 in the bearing, and cutout portions 40 in the bearing support. In the illustrated bearing assembly lubrication is provided by passage of oil through an oil inlet 44, corresponding oil channels 46 and bearing center groove 48.

The portion of the bearing assembly adapted for rotation comprises a shaft 18, typically of steel or like material characterized by high strength, good fatigue life, toughness, etc., having a collet 20 mounted thereon. As shown in Fig. 2, the outer cylindrical surface 22 of the collet 20 is tapered to permit a journal sleeve 24 to be readily slipped onto the collet and thereafter wedged into proper alignment and/or adjustment by tightening a locking nut 26 which threadedly engages a portion of the collet.

Inlaid into or deposited on the outer cylindrical surface 25 of the journal sleeve 24 is a soft bearing material 28. This layer or coating of soft bearing material provides, in cooperation with the hard wear surface 13 of the bearing 12, the greatly improved operating characteristics of the present bearing assembly.

Referring now in more detail to the bearing 12, in general, the type of bearing contemplated in the present invention is formed from a hard strong material such as a low alloy steel or the like, a particular example being SAE 1045 steel. Moreover, I have found that superior results are obtained when the hardness of the wear surface 13 is at least 28 Rockwell C. Such a bearing may be employed as a split bearing, as shown in Figs. 1 and 2, or if desired, as a one-piece annular ring adapted to be fitted on over a corresponding journal member.

Various types of babbitt type materials are suitable for the journal coating or layer 28. Examples of suitable materials are lead-base alloys containing minor proportions of one or more of such alloy constituents as tin, cadmium, indium, antimony or copper; tin-base alloys containing a minor proportion of one or more of such alloy constituents as lead, cadmium, indium, antimony or copper; or cadmium-base alloys containing a minor proportion of one or more of such alloy constituents as lead, tin, indium, antimony or copper. A particular example of a suitable material is an alloy consisting of 92.5% lead, 4% tin and 3.5% antimony.

For superior results, the soft bearing material generally should have a thickness equal to the size of the largest abrasive particle encountered. Hence the soft bearing material should be thick enough to completely embed the largest abrasive particles to which it may be subjected. In most instances it should be no thicker. As mentioned earlier in the specification the properties of bearing embeddability and fatigue strength are generally incompatible. Hence, providing an optimum bearing embeddability must necessarily involve a certain compromise insofar as the bearing fatigue strength is concerned. However, I have found by providing a soft bearing material in a thickness approximately equal to the size of the largest abrasive particles to be encountered that an excellent bearing fatigue strength can be maintained. It will be understood of course that the thickness to be employed in a particular bearing depends upon the application intended and the type of abrasive particles encountered. However, I have found that the thickness of the soft bearing material should not exceed .001 inch in most applications. In certain applications where an increased embeddability is desired the thickness can be increased up to about .005 inch.

Various changes and modifications of the embodiments of the invention described herein may be made by those skilled in the art without departing from the spirit and principles of the invention.

What is claimed is:
1. A bearing assembly comprising a bearing support, a bearing mounted on said support and having a hard wear surface, a journal having a soft wear surface rotatably mounted in said bearing and supported thereby, means on the bearing support and bearing permitting movement of said bearing circumferentially to a new position in said bearing support, and mechanism for locking said bearing in said new position.

2. A bearing assembly comprising a bearing support, a bearing having a hardness of at least 28 Rockwell C. on said bearing support, a journal rotatably mounted in said bearing and supported thereby, said journal having a wear surface formed of soft bearing material, means on the bearing support and bearing permitting movement of said bearing circumferentially to a new position with reference to the journal to present a new wear surface, and means for holding the bearing in said new position.

3. A bearing assembly comprising a bearing support, a bearing having a hard wear surface mounted thereon, a journal having an adjustable soft wear surface rotatably mounted in said bearing and supported thereby, means on the bearing support and bearing for permitting movement of said bearing circumferentially in said bearing support to a new wear position, and means for locking the bearing in said new position.

4. A bearing assembly comprising a bearing housing, a hard steel bearing supported therein, a journal rotatably mounted within said hard bearing and supported thereby, means on the bearing housing and bearing permitting movement of the hard steel bearing circumferentially in said housing to a new position, and means for locking said bearing in said new position comprising bolts extending through the housing into openings formed by aligning corresponding cutout portions of said bearing and said housing; said journal comprising a shaft, a collet having a tapered outer cylindrical surface mounted on said shaft, and a journal sleeve fitted over said cylindrical surface and maintained in adjustment thereon by a nut engaging a threaded portion of said collet, the outer cylindrical surface of said journal sleeve having a coating of a soft bearing material, said coating having thickness not in excess of about .005".

5. A bearing assembly comprising a bearing housing, a hard bearing supported therein, a journal rotatably mounted within said bearing and supported thereby, means on the housing and bearing permitting movement of the hard bearing circumferentially in said housing to a new wear position, and means for locking said bearing in said new position; said journal comprising a shaft, a sleeve on said shaft having an outer surface of soft bearing material, means on the shaft for moving the sleeve axially with respect to the shaft to a new position, and means for holding said sleeve in said new position.

6. A journal bearing assembly comprising a bearing support, a hard bearing carried by the support and having a hardness of at least about 28 Rockwell C, a journal rotatably mounted within said bearing and supported thereby, means on the bearing support and bearing permitting movement of the hard bearing circumferentially in said bearing support to a new position, means for locking the bearing in said new position, said journal comprising a shaft having a layer of soft material thereon, said layer having a thickness not greater than about .005".

7. A journal bearing assembly comprising a bearing support, a hard bearing carried by the support, a journal rotatably mounted within said bearing and supported thereby, means on the bearing support and bearing permitting movement of the hard bearing circumferentially in said bearing support to a new position, means for locking the hard bearing in said new position, said journal comprising a shaft having a thin layer of soft material thereon.

8. A journal bearing assembly as in claim 7 in which the thin layer of soft bearing material has a thickness not in excess of .005", said soft material being selected from the group consisting of lead-base alloys, tin-base alloys and cadmium-base alloys, and the bearing is of steel having a hardness of at least 28 Rockwell C.

References Cited in the file of this patent

UNITED STATES PATENTS

| | | |
|---|---|---|
| 245,343 | Bradley | Aug. 9, 1881 |
| 274,159 | Whiting | Mar. 20, 1883 |
| 579,265 | Gulick | Mar. 23, 1897 |
| 1,714,153 | Bechman | May 21, 1929 |
| 1,872,600 | Manning | Aug. 16, 1932 |
| 2,048,972 | Scheffler | July 28, 1936 |
| 2,333,227 | Bagley | Nov. 2, 1943 |
| 2,586,099 | Schultz | Feb. 19, 1952 |

FOREIGN PATENTS

| | | |
|---|---|---|
| 104,275 | Australia | June 30, 1938 |
| 196,710 | Great Britain | May 2, 1923 |